(12) United States Patent
Mann et al.

(10) Patent No.: US 8,711,472 B2
(45) Date of Patent: Apr. 29, 2014

(54) OPTICAL IMAGING DEVICE AND IMAGING METHOD FOR MICROSCOPY

(75) Inventors: Hans-Juergen Mann, Oberkochen (DE); Heiko Feldmann, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 630 days.

(21) Appl. No.: 12/568,306

(22) Filed: Sep. 28, 2009

(65) Prior Publication Data

US 2010/0149632 A1 Jun. 17, 2010

Related U.S. Application Data

(60) Provisional application No. 61/101,485, filed on Sep. 30, 2008.

(30) Foreign Application Priority Data

Sep. 30, 2008 (DE) .......................... 10 2008 049 588

(51) Int. Cl.
*G02B 21/04* (2006.01)

(52) U.S. Cl.
USPC ........................... 359/364; 359/368; 359/727

(58) Field of Classification Search
USPC ......... 359/351, 355, 359, 364, 368, 586, 588, 359/589, 726, 727; 355/66; 356/247, 399, 356/401
See application file for complete search history.

(56) References Cited

U.S. PATENT DOCUMENTS

| 3,527,526 A | 9/1970 | Silvertooth |
| 3,748,015 A | 7/1973 | Offner |
| 4,863,253 A | 9/1989 | Shafer et al. |
| 5,031,976 A | 7/1991 | Shafer |
| 5,638,219 A | 6/1997 | Medina Puerta et al. |
| 6,109,756 A * | 8/2000 | Takahashi ..................... 359/857 |
| 6,600,608 B1 | 7/2003 | Shafer et al. |
| 6,639,734 B2 | 10/2003 | Omura |
| 2002/0018309 A1* | 2/2002 | Braat ............................ 359/856 |
| 2003/0063375 A1* | 4/2003 | Suzuki et al. ................. 359/359 |
| 2003/0147130 A1* | 8/2003 | Terasawa ...................... 359/366 |
| 2004/0114217 A1 | 6/2004 | Mann et al. |
| 2004/0218163 A1* | 11/2004 | Sasaki et al. .................... 355/67 |
| 2006/0017905 A1* | 1/2006 | Suzuki ............................ 355/67 |
| 2007/0070322 A1* | 3/2007 | Hudyma et al. ................ 355/67 |

(Continued)

FOREIGN PATENT DOCUMENTS

| DE | 10 2005 056 721 | 11/2006 |
| EP | 0 267 766 A2 | 5/1988 |

*Primary Examiner* — Frank Font

(74) *Attorney, Agent, or Firm* — Fish & Richardson P.C.

(57) ABSTRACT

The present invention relates to an optical imaging device, in particular for microscopy, with a first optical element group and a second optical element group, wherein the first optical element group and the second optical element group, on an image plane, form an image of an object point of an object plane via at least one imaging ray having an imaging ray path. The first optical element group comprises a first optical element with a reflective first optical surface in the imaging ray path and a second optical element with a reflective second optical surface in the imaging ray path, wherein the first optical surface is concave. The second optical element group comprises a third optical element with a concave reflective third optical surface in the imaging ray path and a fourth optical element with a convex reflective fourth optical surface in the imaging ray path without light passage aperture.

26 Claims, 3 Drawing Sheets

(56) References Cited

U.S. PATENT DOCUMENTS

| | | | |
|---|---|---|---|
| 2007/0153398 A1* | 7/2007 | Shafer et al. | 359/649 |
| 2007/0223112 A1* | 9/2007 | Mann et al. | 359/726 |
| 2010/0188738 A1 | 7/2010 | Epple et al. | |
| 2011/0002032 A1* | 1/2011 | Omura | 359/364 |
| 2012/0092760 A1* | 4/2012 | Omura | 359/365 |

\* cited by examiner

OPTICAL IMAGING DEVICE AND IMAGING METHOD FOR MICROSCOPY

CROSS-REFERENCE TO RELATED APPLICATIONS

This application claims priority under 35 U.S.C. §119(e)(1) to U.S. Provisional Application No. 61/101,485 filed Sep. 30, 2008. This applications also claims priority under 35 U.S.C. §119 to German Patent Application DE 10 2008 049 588.3, filed Sep. 30, 2008. The contents of both of these applications are hereby incorporated by reference in their entirety.

BACKGROUND OF THE INVENTION

The present invention relates to optical imaging devices and imaging methods for microscopy. The invention can be applied in connection with the inspection of arbitrary surfaces or bodies.

In many technical areas, it is necessary, among others, to subject bodies and their surfaces to a precise optical inspection in order to be able, for example, to assess the quality of a production process and, where applicable, intervene correctively insofar as the inspection reveals that specified quality criteria are not fulfilled. Naturally, the same if not higher requirements must be imposed on the precision of the imaging device used for the inspection in comparison with the devices used for the production process of the body to be inspected.

In this context, the ability of the imaging device used for the inspection to process light of different wavelengths with minimum optical aberration is of particular importance in order to ensure a broad application field for the imaging device. In particular, in connection with the production methods which comprise an optical process, it is desirable or advantageous if the imaging device used can process the wavelength range also used during the optical process with minimum aberrations. This is, for example, the wavelength range of 193 nm (so called VUV range) to 436 nm (so called Hg g line).

A problem here is the chromatic aberrations i.e. the aberrations dependent on the wavelength of the light. If, for example, an imaging device with refractive optical elements (such as lenses or the like) is used for inspection, the aberrations of the imaging device are minimised at acceptable cost usually only for a comparatively narrow wavelength range. A so-called achromatization of such an imaging device comprising refractive optical elements, i.e. elimination of such chromatic aberrations, is scarcely possible with acceptable cost over a broadband wavelength range (such as that recited above).

Frequently, so-called catadioptric imaging devices are used which, apart from refractive optical elements, also comprise reflective optical elements. The disadvantages of refractive systems described above, however, also apply to such catadioptric systems as known for example from DE 10 2005 056 721 A1 (Epple et al.), U.S. Pat. No. 6,600,608 B1 (Shafer et al.), U.S. Pat. No. 6,639,734 B1 (Omura) and U.S. Pat. No. 5,031,976 (Shafer), the entire disclosure of which is hereby included herein by reference.

One possibility of largely avoiding the problems associated with chromatic aberrations is to use so-called catoptric systems in which exclusively reflective optical elements (such as mirrors or the like) are used for the imaging device. Examples of such catoptric systems are known from EP 0 267 766 A2 (Phillips), U.S. Pat. No. 4,863,253 (Shafer et al.) and US 2004/0114217 A1 (Mann et al.), the entire disclosure of which is hereby included herein by reference.

The problem with these known catoptric systems, however, is that for a desirably large magnification to be achieved with as few optical elements as possible, in particular, for the optical elements close to the object, comparatively large individual refractive powers are required. However, in view of the aberrations generated with such catoptric systems, this is disadvantageous so that, frequently, preference is given to the use of more than four mirrors, as it is known from US 2004/0114217 A1 (Mann et al.), or smaller magnifications or greater aberrations must be accepted.

If, in the system from US 2004/0114217 A1 (Mann et al.), only four mirrors are used, then a comparatively low numerical aperture of NA=0.7 can be achieved. Also, the mirror spatially closest to the object has a comparatively large diameter, which leads to a comparatively large thickness dimension and hence a greater working distance (between reflective surface and object surface).

A further problem in this context is the minimum obscuration at simple manufacture of the imaging device. In many systems the central passage apertures in the mirrors must therefore be designed conically in order to achieve minimum obscuration. Such conical passage apertures are however comparatively complex to produce, so that, as a result, the cost for the imaging device rises considerably.

In this context it is known from EP 0 267 766 A2 (Phillips) to use, instead of the conventional imaging devices with four mirrors each having a passage aperture, a system with two optical element groups, each of which comprises one convex mirror without passage aperture and one concave mirror with passage aperture. Here too, the problem is that, on the one hand, a very low numerical aperture (NA=0.3) can be achieved and that the mirror closest to the object again has a very large diameter.

BRIEF SUMMARY OF THE INVENTION

The present invention is therefore based on the object of providing an optical imaging device and an optical imaging method which do not have or which have to a lesser extent the above disadvantages, and which, in particular, with acceptable size of the optical elements used, allow a high magnification and a high numerical aperture with minimum aberrations.

The present invention is based on the cognition that, in a simple manner, with acceptable size of the optical elements used, a high magnification and a high numerical aperture can be in achieved with minimum aberrations if, in a system with two optical element groups each comprising two optical elements, on the one hand, the second optical element group comprises a surface pair of a concave optical surface and a convex optical surface without passage aperture, and, on the other hand, the first optical element group comprises a first optical element with a concave optical surface.

The design of the second optical element group with a convex optical element without passage aperture, on the one hand, brings the advantage of substantially easier manufacture thanks to the absence of passage aperture. On the other hand, the concave optical surface of the first optical element allows the achievement of a high numerical aperture with small dimensions of the optical elements of the first optical element group. Thus, with the same aspect ratio (ratio of minimum axial thickness to maximum diameter), a smaller working distance from the object can be achieved with a large image field. Furthermore, with such a system, a good image error correction is possible.

Thus, according to one aspect, the present invention relates to an optical imaging device, in particular for microscopy, with a first optical element group and a second optical element group, wherein the first optical element group and the second optical element group, on an image plane, form an image of an object point of an object plane via at least one imaging ray having an imaging ray path. The first optical element group comprises a first optical element with a reflective first optical surface in the imaging ray path and a second optical element with a reflective second optical surface in the imaging ray path, wherein the first optical surface is concave. The second optical element group comprises a third optical element with a concave reflective third optical surface in the imaging ray path and a fourth optical element with a convex. In some embodiments, the first optical element group and the second optical element group, via the imaging ray, form an image of the object point in a magnifying manner having an imaging scale which is at least 4, preferably at least 10, further preferably at least 100.

According to a further aspect, the present invention relates to a microscope, in particular for the inspection of substrates, with a substrate device to hold a substrate to be inspected, an illumination device to illuminate the substrate with at least one imaging ray, a projection device and an image receiver device, wherein the projection device is designed to project the imaging ray onto the image receiver device. The projection device itself comprises an optical imaging device according to the invention.

According to a further aspect, the present invention relates to an imaging method, in particular for microscopy, in which via a first optical element group and a second optical element group, by means of at least one imaging ray having an imaging ray path, an image of an object point of an object plane is formed on an image plane, wherein the first optical element group comprises a first optical element with a reflective first optical surface in the imaging ray path and a second optical element with a reflective second optical surface in the imaging ray path, whereas the second optical element group comprises a third optical element with a concave reflective third optical surface in the imaging ray path and a fourth optical element with a convex reflective fourth optical surface in the imaging ray path having no light passage aperture. A concave optical surface is used as the first optical surface.

Further preferred embodiments of the invention will become apparent from the dependent claims and the following description of preferred embodiments which refers to the enclosed drawings.

DETAILED DESCRIPTION OF THE INVENTION

Figure 1:
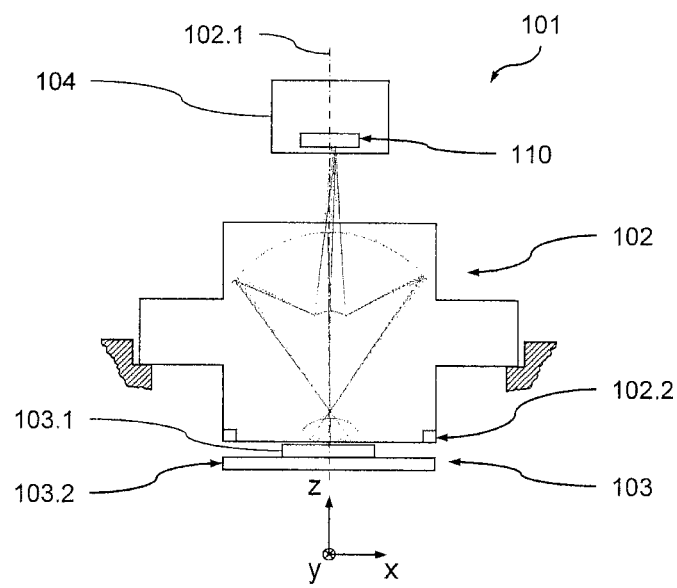
FIG. 1 is a schematic representation of a preferred embodiment of a microscope according to the invention with a preferred embodiment of the optical imaging device according to the invention, with which a preferred embodiment of an imaging method according to the invention can be performed.
Figure 2:
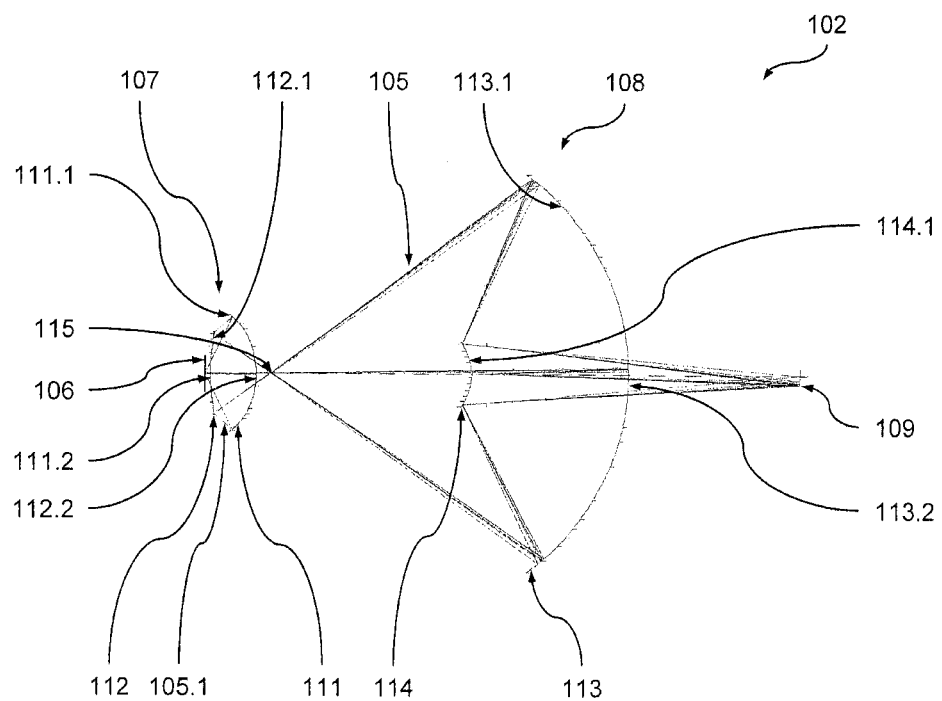
FIG. 2 is a schematic representation of the optical imaging device of FIG. 1.
Figure 3:
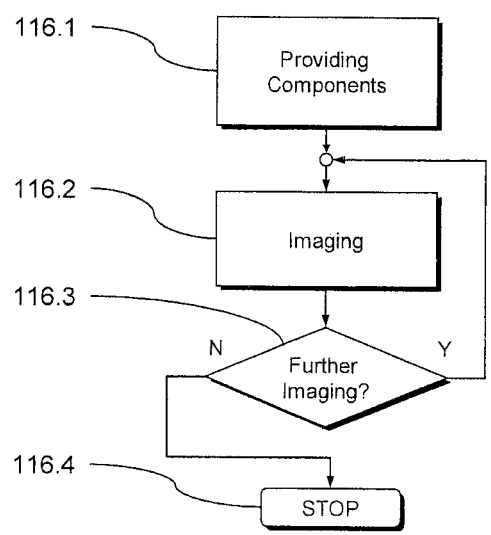
FIG. 3 is a block diagram of a preferred embodiment of the imaging method according to the invention which can be performed with the microscope of FIG. 1.

With reference to FIGS. 1 to 3, a preferred embodiment of the microscope 101 according to the invention comprising a preferred embodiment of the optical imaging device 102 according to the invention is described below.

In the present example, the microscope 101 is used to inspect the structures formed on a substrate 103.1 (which were produced, for example, via an optical process). However, with other variants of the invention, the microscope according to the invention can also be used for an imaging process in connection with arbitrary applications, in particular, with the inspection of arbitrary other bodies, substrates, surfaces or fluids etc.

FIG. 1 shows a schematic representation of the microscope 101 which comprises an optical imaging device in the form of an objective 102 (with an optical axis 102.1 and an illumination system 102.2), a substrate device 103 and an image recording device 104. The illumination system 102.2 illuminates (via a light guide device not shown in greater detail) the substrate 103.1 which is arranged on a substrate table 103.2 of the substrate device 103, with an imaging light beam 105 (only depicted partially, among others, through its envelope rays) which comprises a plurality of imaging rays 105.1.

By means of the imaging light beam 105, the structures located in a so-called object plane 106 on the surface of the substrate 103.1 facing the lens 102 are imaged, via the optical elements, arranged in the objective 102, of a first optical element group 107 and a second optical element group 108, on an image plane 109 of an image sensor 110 of the image recording device 104. The data obtained from the signals of the image sensor 110 are then used in a conventional manner to inspect the surface of the substrate 103.1.

The first optical element group 107 comprises a first optical element 111 (reached by the imaging rays 105.1 as the first optical element) in the imaging ray pathway of the imaging rays 105.1, and a second optical element 112 (reached by the imaging rays 105.1 as the second optical element) in the imaging ray pathway of the imaging rays 105.1. The second optical element group 108 comprises a third optical element 113 (reached by the imaging rays 105.1 as the third optical element) in the imaging ray path of the imaging rays 105.1, and a fourth optical element 114 (reached by the imaging rays 105.1 as the fourth optical element) in the imaging ray path of the imaging rays 105.1.

The optical elements 111 to 114 of the optical element groups 107 and 108 (which define an optical axis 102.1 of the lens 102 and, where applicable, a symmetry axis of the objective 102, respectively) in the present example are reflective optical elements (in the form of mirrors or the like) with at least partly aspherical optical surfaces 111.1 to 114.1.

The exclusive use of reflective optical surfaces has the advantage that, using the objective 102, corrected accordingly, where necessary, for any aberrations, at different wavelengths of the imaging light beam 105, no significant chromatic aberrations occur in formation of an image of a point of the object plane 106 on a point of the image plane 109. Thus, for the imaging light beam 105, light of a wide wavelength range can be used. In particular, the wavelength of the imaging light beam 105 can be adapted to the wavelength of the light which was used for the production of the structures on the substrate 103.1.

In the present example, light in the UV range with a wavelength of 193 nm is used for the imaging light beam 105. As previously stated, however, with other variants of the invention, other wavelengths can also be used. In the present example, the objective 102 is a broadband objective which can process, without significant chromatic aberrations, light in a wavelength range from 193 nm (so-called VUV range) to 436 nm (so called Hg g line) for the imaging light beam 105. In this range, among others, wavelengths of 248 nm (so called DUV range), 365 nm (so-called Hg i line) and 405 nm (so called Hg h line) can be used for the imaging light beam 105.

As can be seen, in particular, from FIG. 2 (showing a schematic view of the first and second optical element groups 107 and 108), the first optical element 111 has a concave reflective first optical surface 111.1 which faces a concave reflective second optical surface 112.1 of the second optical element 112. Similarly, the third optical element 113 has a concave reflective third optical surface 113.1 which faces a convex reflective fourth optical surface 114.1 of the fourth optical element 114. It is evident here that the optical surfaces in other variants of the invention can have a different shape. In particular, the second optical surface, if necessary, can be formed as a planar surface or even a convex surface.

The imaging rays 105.1 emitted by the object plane 106 first pass through a central passage aperture 112.2, arranged in the area of the optical axis 102.1, of the second optical element 112 which lies spatially closest to the object plane 106. From there the imaging rays 105.1 hit the first optical surface 111.1 and are reflected here. Then, the imaging rays 105.1 hit the second optical surface 112.1 and are reflected at the latter. Then, the imaging rays 105.1 pass through a central passage aperture 111.2, arranged in the area of the optical axis 102.1, of the first optical element 111.

As is further evident from FIG. 2, the first optical surface 111.1 and the second optical surface 112.1 are designed and spatially associated to each other so that the imaging rays 105.1, after reflection on the second optical surface 112.1, generate a real intermediate image 115. The intermediate image 115 is formed in the area of the passage aperture 111.2 of the first optical element 111 (more precisely, in the imaging ray path, just behind the passage aperture 111.2). Then, the imaging rays 105.1 enter the space between the two optical elements 113 and 114 of the second optical element group 118 which is formed in the manner of a Cassegrain system with a concave third optical surface 113.1 and a convex fourth optical surface 114.1.

It is evident in this context that, with other variants of the invention, the intermediate image can be arranged at different places. In particular, it can be located just before the passage aperture of the first optical element or, where applicable, even in the passage aperture of the first optical element.

The objective 102, at its end on the object side, has a numerical aperture NA>0.7. In the present example, the numerical aperture on the object side is approximately NA=0.9. The object side end of the objective 102 is therefore a high aperture end of the objective 102. As further shown in FIG. 2, the numerical aperture in the area of the intermediate image 105 is smaller than the numerical aperture at the object side end, so that, consequently, the image formation by the first optical element group 107 at the intermediate image 115 is a magnifying image formation.

The arrangement of the intermediate image 115 in the area of the passage aperture 111.2 has the advantage that the passage aperture 111.2 can be designed comparatively small in order to keep the obscuration it causes small as well. The third optical surface 113.1 and the fourth optical surface 114.1 are designed and associated to each other so that the imaging rays 105.1, after passing through the passage aperture 111.2, first hit the third optical surface 113.1 and are reflected at the latter. Then, the imaging rays 105.1 hit the fourth optical surface 114.1 and are reflected at the latter such that they pass through a central passage aperture 113.2 (arranged in the area of the optical axis 102.1) of the third optical element 113. Finally the imaging rays 105.1 hit the object plane 109 to form a final image.

Figure 4:
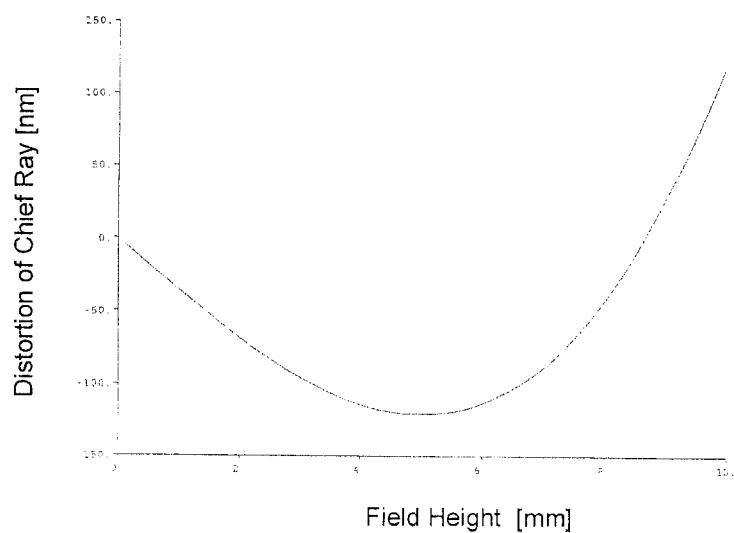
FIG. 4 is a representation of the distortion of the objective of FIG. 1.
Figure 5:
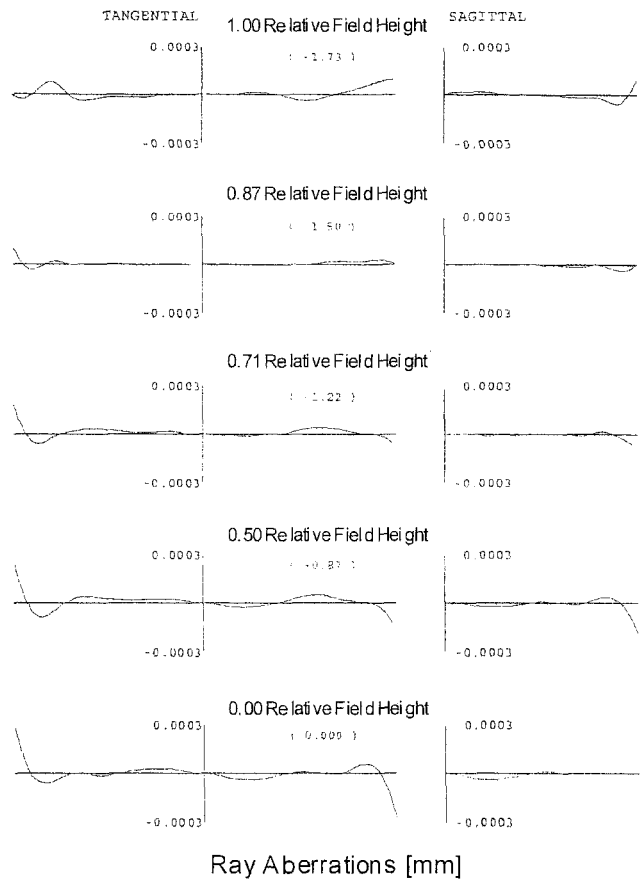
FIG. 5 is a representation of the transverse and longitudinal aberrations of the objective of FIG. 1.
Figure 5:
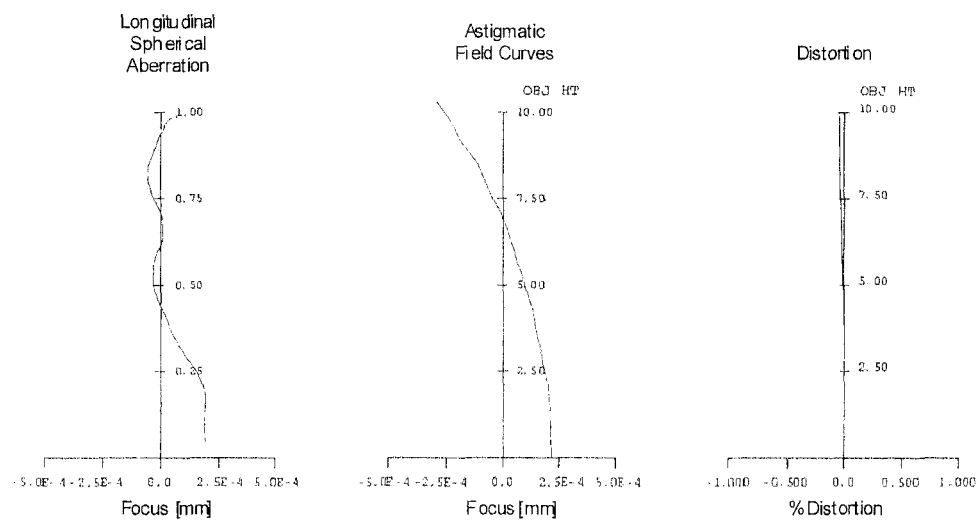

The second optical element group 108 provides a further magnification of the intermediate image so that, in total, with the objective 102 an advantageously strong magnification can be achieved. With the present objective 102, apart from the high numerical aperture NA=0.90 on the object side, among others, a favorable field diameter of approximately 1 mm and, hence, a favorable field size of around 1.4 mm×1.4 mm at the high aperture end can be in achieved. With preferred variants of the objective according to the invention, the half field diameter of the objective at this high aperture end in each case is more than 0.2 mm, so that, advantageously, a corrected Petzval sum is guaranteed for the objective. Furthermore, advantageously, a correction is possible of aberrations which lie above 95% Strehl ratio (corresponding to a mean wave front deviation of approximately 35 m$\lambda$ rms). In particular, the maximum value of the wave front error (rms) over the above field is approximately 2.7 nm (which, for a wavelength of 193 nm, corresponds to about 14 m$\lambda$). The pupil obscuration of the objective 102 is maximum 25% whereas the distortion of the objective 102 lies below 0.04%. The FIGS. 4 and 5 show the distortion and further transverse and longitudinal aberrations of the objective 102.

The second optical element 112 has an aspect ratio (ratio of the thickness dimension in the direction of the optical axis 102.1 in the centre area to the diameter) of less than 0.05 (i.e. in other words, less than 5%). In the present example, the aspect ratio is 0.0476 (i.e. 4.76%). However, smaller aspect ratios can also be achieved. This is advantageous with regard to simple manufacture and the thermal, dynamic and static stability of the optical element 112.

Designing the second optical element group 108 with the convex fourth optical element 114 without a passage aperture, on the one hand, brings along the advantage of considerably easier manufacture of the objective 102 thanks to the absence of a passage aperture.

On the other hand, the concave first optical surface 111.1 of the first optical element 111 allows the achievement of a high numerical aperture with small dimensions of the optical elements 111 and 112 of the first optical element group 107. Thus, in the present example, for the first optical element 111 and the second optical element 112 (in the plane perpendicular to the optical axis 102.1), diameters of less than 100 mm can be achieved.

With the aspect ratio (ratio of smallest axial thickness to maximum diameter) remaining the same, therefore, a small working distance from the object plane 106 with the large image field as outlined above can be achieved. Also, with such a system, good image error correction is possible.

Evidently, however, with other variants of the invention, in particular, for the second optical element located spatially closest to the object plane, a greater diameter can be selected in order to achieve, where applicable, a higher edge thickness which increases the static, dynamic and thermal stability of this optical element.

Objective 102, in the present example, is formed telecentric on the side of the object plane 106 so that the imaging scale does not change on axial object displacement. Evidently, with other variants of the invention, other non-telecentric designs can be selected.

FIG. 3 shows a flow chart of a preferred variant of an imaging method according to the invention of the optical element 106.1, which is performed with microscope 101.

First, in step 116.1 the components of the microscope 101 are made available and positioned in the manner described above.

In a step 116.2, the substrate 103.1 is illuminated with the imaging light beam 105 via the illumination device 102 and then, via the objective 102, an image of corresponding areas of the surface of the substrate 103.1 is formed on the sensor surface of the image sensor 110 as described above.

In a step 116.3, it is then checked whether a further imaging process should be performed. If this is the case, we return to step 116.2. Otherwise, the process ends in a step 116.4.

The present invention has been described above exclusively with reference to an example with four optical elements. It is evident, however, that other variants, apart from the four optical elements, can have further optical elements, for example, a further mirror group can be used. Where applicable, these further optical elements can be arranged at any arbitrary suitable point in the imaging ray path.

The present invention has been described above exclusively with reference to an example from the field of inspection of a substrate. Evidently, the present invention can also be used for any other applications or imaging methods, in particular, for arbitrary wavelengths of the light used for imaging.

The invention claimed is:

1. An optical imaging device comprising:
   a first optical element group, and
   a second optical element group,
   wherein:
      during use of the optical imaging device, the first optical element group and the second optical element group, on an image plane of the optical imaging device, form an image of an object point of an object plane of the optical imaging device via at least one imaging ray having an imaging ray path,
      the first optical element group comprises a first optical element comprising a reflective first optical surface in the imaging ray path and a second optical element comprising a reflective second optical surface in the imaging ray path,
      the second optical element group comprises a third optical element comprising a concave reflective third optical surface in the imaging ray path and a fourth optical element comprising a convex reflective fourth optical surface in the imaging ray path having no light passage aperture,
      the reflective first optical surface is concave,
      the imaging ray path sequentially impinges on the reflective first, second, third and fourth optical surfaces,
      neither a refractive optical surface nor a reflective optical surface is present in the imaging ray path between the reflective first optical surface and the reflective second optical surface,
      the imaging ray path does not impinge on a reflective optical surface between the reflective second optical surface and the reflective third optical surface, and
      the first optical element and/or the second optical element and/or the third optical element has a central passage aperture for the at least one imaging ray.

2. The optical imaging device according to claim 1, wherein the reflective second optical surface is concave.

3. The optical imaging device according to claim 1, wherein:
   during use of the optical imaging device, the first optical element group and the second optical element group, via the at least one imaging ray, form an image of the object point in a magnifying manner having an imaging scale, and
   a magnitude of the imaging scale is at least 4.

4. The optical imaging device according to claim 1, wherein a reflective optical surface which is located spatially closest to an object plane end of the optical imaging device is an aspherical surface.

5. The optical imaging device according to claim 1, wherein, on an object plane side of the optical imaging device, the optical imaging device has a high aperture end with a numerical aperture of at least 0.7.

6. The optical imaging device according to claim 5, wherein an optical element which is located spatially closest to the high aperture end has an aspect ratio of maximum 10%.

7. The optical imaging device according to claim 5, wherein a field radius at the high aperture end is at least 0.1 mm.

8. The optical imaging device according claim 1, wherein optical elements of each of the first element group and the second element group have a diameter of less than 400 mm.

9. The optical imaging device according to claim 1, wherein the optical imaging device has a pupil obscuration.

10. The optical imaging device according to claim 1, wherein, during use of the optical imaging device, the optical imaging device generates at least one real intermediate image.

11. The optical imaging device according to claim 10, wherein the intermediate image is arranged in an area of a convex reflective optical surface.

12. The optical imaging device according to claim 1, wherein, during use of the optical imaging device, the first optical element group and the second optical element group image the object point to infinity.

13. The optical imaging device according to claim 1, wherein the at least one imaging ray has a wavelength of 193 nm to 436 nm.

14. The optical imaging device according to claim 1, wherein the optical imaging device is telecentric on an object plane side of the optical imaging device.

15. The optical imaging device of claim 1, wherein the optical imaging device comprises precisely four reflective optical surfaces.

16. The optical imaging device of claim 1, wherein neither a refractive optical surface nor a reflective optical surface is present in the imaging ray path between the reflective fourth optical surface and the image plane.

17. A microscope, comprising:
   an illumination device configured to illuminate a substrate with at least one imaging ray, and
   a projection device,
   wherein the projection device is configured to project the at least one imaging ray onto an image receiver device, and the projection device comprises an optical imaging device which comprises a first optical element group and a second optical element group,
   wherein:
      during use of the optical imaging device, the first optical element group and the second optical element group, on an image plane of the optical imaging device, form an image of an object point of an object plane of the optical imaging device via at least one imaging ray having an imaging ray path,
      the first optical element group comprises a first optical element comprising a reflective first optical surface in the imaging ray path and a second optical element comprising a reflective second optical surface in the imaging ray path,
      the second optical element group comprises a third optical element comprising a concave reflective third optical surface in the imaging ray path and a fourth optical element comprising a convex reflective fourth optical surface in the imaging ray path having no light passage aperture, the reflective first optical surface is concave, the imaging ray path sequentially impinges on the reflective first, second, third and fourth optical surfaces, neither a refractive optical surface nor a reflective optical surface is present in the imaging ray path between the reflective first optical surface and the reflective second optical surface, and the imaging ray path does not impinge on a reflective optical surface between the reflective second optical surface and the reflective third optical surface.

18. The microscope of claim 17, wherein neither a refractive optical surface nor a reflective optical surface is present in the imaging ray path between the reflective fourth optical surface and the image plane.

19. A method, comprising:

forming, via at least one imaging ray, an image of object point of an object field on an image plane using a first optical element group and a second optical element group, wherein:

the first optical element group comprises a first optical element comprising a reflective first optical surface in the imaging ray path and a second optical element comprising a reflective second optical surface in the imaging ray path, the second optical element group comprises a third optical element comprising a concave reflective third optical surface in the imaging ray path and a fourth optical element comprising a convex reflective fourth optical surface in the imaging ray path having no light passage aperture, the reflective first optical surface is concave, the imaging ray path sequentially intersects the reflective first, second, third and fourth optical surfaces, neither a refractive optical surface nor a reflective optical surface is present in the imaging ray path between the reflective first optical surface and the reflective second optical surface, the imaging ray path does not impinge on a reflective optical surface between the reflective second optical surface and the reflective third optical surface, and the first optical element and/or the second optical element and/or the third optical element has a central passage aperture for the at least one imaging ray.

20. The method according to claim 19, wherein the reflective second optical surface is concave.

21. The method according to claim 19, wherein:

the first optical element group and the second optical element group, via the at least one imaging ray, form an image of the object point in a magnifying manner having an imaging scale, and a magnitude of the imaging scale is at least 4.

22. The method according to claim 19, wherein at least one real intermediate image is generated.

23. The method of claim 19, wherein the optical imaging device comprises precisely four reflective optical surfaces.

24. An optical imaging device comprising:

a first optical element group, and a second optical element group, wherein:

during use of the optical imaging device, the first optical element group and the second optical element group, on an image plane of the optical imaging device, form an image of an object point of an object plane of the optical imaging device via at least one imaging ray having an imaging ray path, the first optical element group comprises a first optical element comprising a reflective first optical surface in the imaging ray path and a second optical element comprising a reflective second optical surface in the imaging ray path, the second optical element group comprises a third optical element comprising a concave reflective third optical surface in the imaging ray path and a fourth optical element comprising a convex reflective fourth optical surface in the imaging ray path having no light passage aperture, the reflective first optical surface is concave, the imaging ray path sequentially impinges on the reflective first, second, third and fourth optical surfaces, neither a refractive optical surface nor a reflective optical surface is present in the imaging ray path between the reflective first optical surface and the reflective second optical surface, the imaging ray path does not impinge on a reflective optical surface between the reflective second optical surface and the reflective third optical surface, and the reflective second optical surface is concave.

25. An optical imaging device comprising:

a first optical element group, and a second optical element group, wherein:

during use of the optical imaging device, the first optical element group and the second optical element group, on an image plane of the optical imaging device, form an image of an object point of an object plane of the optical imaging device via at least one imaging ray having an imaging ray path, the first optical element group comprises a first optical element comprising a reflective first optical surface in the imaging ray path and a second optical element comprising a reflective second optical surface in the imaging ray path, the second optical element group comprises a third optical element comprising a concave reflective third optical surface in the imaging ray path and a fourth optical element comprising a convex reflective fourth optical surface in the imaging ray path having no light passage aperture, the reflective first optical surface is concave, the imaging ray path sequentially impinges on the reflective first, second, third and fourth optical surfaces, neither a refractive optical surface nor a reflective optical surface is present in the imaging ray path between the reflective first optical surface and the reflective second optical surface, the imaging ray path does not impinge on a reflective optical surface between the reflective second optical surface and the reflective third optical surface, and during use of the optical imaging device, the first optical element group and the second optical element group image the object point to infinity.

26. A method, comprising:

forming, via at least one imaging ray, an image of object point of an object field on an image plane using a first optical element group and a second optical element group, wherein:
  the first optical element group comprises a first optical element comprising a reflective first optical surface in the imaging ray path and a second optical element comprising a reflective second optical surface in the imaging ray path,
  the second optical element group comprises a third optical element comprising a concave reflective third optical surface in the imaging ray path and a fourth optical element comprising a convex reflective fourth optical surface in the imaging ray path having no light passage aperture,
  the reflective first optical surface is concave,
  the imaging ray path sequentially intersects the reflective first, second, third and fourth optical surfaces,
  neither a refractive optical surface nor a reflective optical surface is present in the imaging ray path between the reflective first optical surface and the reflective second optical surface,
  the imaging ray path does not impinge on a reflective optical surface between the reflective second optical surface and the reflective third optical surface, and
  the reflective second optical surface is concave.

* * * * *

UNITED STATES PATENT AND TRADEMARK OFFICE
CERTIFICATE OF CORRECTION

PATENT NO. : 8,711,472 B2  
APPLICATION NO. : 12/568306  
DATED : April 29, 2014  
INVENTOR(S) : Hans-Juergen Mann et al.

Page 1 of 1

It is certified that error appears in the above-identified patent and that said Letters Patent is hereby corrected as shown below:

In the Specification

In Col. 2, line 49, delete "be in" and insert -- be --.

In Col. 3, line 13, delete "convex." and insert -- convex reflective fourth optical surface in the imaging ray path having no light passage aperture. --.

In Col. 6, line 8, delete "be in" and insert -- be --.

In the Claims

In Col. 8, line 15, in Claim 8, delete "claim" and insert -- to claim --.

Signed and Sealed this  
Fifteenth Day of July, 2014

Michelle K. Lee  
*Deputy Director of the United States Patent and Trademark Office*